(12) United States Patent
 Carmine

(10) Patent No.: US 9,792,536 B2
(45) Date of Patent: Oct. 17, 2017

(54) GATE FOR A PAYMENT INTERFACE

(71) Applicant: MEI, Inc., Malvern, PA (US)

(72) Inventor: Christopher Stephen Carmine, Thornton, PA (US)

(73) Assignee: Crane Payment Innovations, Inc., Malvern, PA (US)

( * ) Notice: Subject to any disclaimer, the term of this patent is extended or adjusted under 35 U.S.C. 154(b) by 11 days.

(21) Appl. No.: 14/281,035

(22) Filed: May 19, 2014

(65) Prior Publication Data

US 2015/0332130 A1    Nov. 19, 2015

(51) Int. Cl.
*G06K 13/06* (2006.01)
*G06K 13/08* (2006.01)
*G07F 7/08* (2006.01)

(52) U.S. Cl.
CPC ......... *G06K 13/06* (2013.01); *G06K 13/0868* (2013.01); *G06K 13/0875* (2013.01); *G06K 13/0881* (2013.01); *G07F 7/0873* (2013.01)

(58) Field of Classification Search
CPC ........... G06K 13/0868; G06K 13/0875; G06K 13/16; G06K 13/06; G06K 13/08; G06K 13/085; G06K 13/0843
USPC ....... 235/475, 479, 483, 449, 439, 440, 379, 235/380, 486, 482
See application file for complete search history.

(56) References Cited

U.S. PATENT DOCUMENTS

| | | | |
|---|---|---|---|
| 3,766,687 A * | 10/1973 | Henson | G06K 13/08 194/210 |
| 5,466,914 A | 11/1995 | Kitahara | |
| 5,831,862 A * | 11/1998 | Hetrick et al. | 700/232 |
| 5,905,252 A * | 5/1999 | Magana | 235/475 |
| 6,186,401 B1 * | 2/2001 | Magana | 235/475 |
| 6,283,268 B1 * | 9/2001 | Fletcher et al. | 194/344 |
| 6,869,012 B2 * | 3/2005 | Yasuda et al. | 235/380 |
| 2011/0006118 A1 * | 1/2011 | Mizawa | G06K 13/0875 235/483 |
| 2013/0299574 A1 | 11/2013 | Theobald | |

FOREIGN PATENT DOCUMENTS

EP    1 071 050 A1    1/2001

OTHER PUBLICATIONS

Extended European Search Report dated Oct. 16, 2015 in connection with European Patent Application No. 15167866.1; 3 pages.

* cited by examiner

*Primary Examiner* — Suezu Ellis

(57) ABSTRACT

A gate assembly can include a housing, a main body, at least one member, and an activation rib. The housing can define at least a portion of a card path of a payment interface. The main body can be coupled to the housing and can be movable between a closed position and an open position. The at least one member can extend from the main body such that, when the main body is in the closed position, the at least one member extends into the card path and can be oriented to inhibit an item from traveling through the card path. The activation rib can extend from the main body and can be located such that, when the main body is in the closed position, the activation rib extends into the card path. Related apparatus, systems, techniques, and articles are also described.

20 Claims, 9 Drawing Sheets

GATE FOR A PAYMENT INTERFACE

TECHNICAL FIELD

The subject matter described herein relates to a gate for a payment interface such as a coin resistant card slot gate for a payment interface.

BACKGROUND

Electronic transaction systems, such as an automatic ticket seller machine, automatic teller machine, vending machine, and other kiosks are provided at unattended places to provide ease and flexibility to a user to perform transactions in return for goods or services. In addition to paper money and coins, many of these machines will accept standard financial transaction cards, such as credit cards, bank cards, gifts cards, and the like. Such machines can have payment interfaces with multiple openings for different payment types. For example, a different opening can be provided for coin, banknote, and financial transaction card.

But users may inadvertently insert a payment into the wrong opening, such as inserting a coin into the opening provided for a financial transaction card, which may jam the system and can make the system inoperative. The jam is compounded if another subsequent user attempts to swipe a card after a coin becomes lodged in the financial transaction opening, since the card can push the coins even further into the opening. Coins (or other non-financial transaction card objects) stuck in the card opening may require a service call to remove. If the coins are jammed far enough into the opening, nearly complete disassembly of the payment interface can be required to remove the coins.

SUMMARY

In an aspect, a gate assembly can include a housing, a main body, at least one member, and an activation rib. The housing can define at least a portion of a card path of a payment interface. The main body can be coupled to the housing and can be movable between a closed position and an open position. The at least one member can extend from the main body such that, when the main body is in the closed position, the at least one member extends into the card path and can be oriented to inhibit an item from traveling through the card path. The activation rib can extend from the main body and can be located such that, when the main body is in the closed position, the activation rib extends into the card path. The activation rib can be coupled to the main body so force applied to the activation rib actuates the main body from the closed position to the open position.

In another aspect, a gate can include a main body, at least one member, and an activation rib. The main body can be capable of coupling to a housing of a payment interface and moving between a closed position and an open position. The at least one member can extend from the main body such that, when the main body is in the closed position, the at least one member extends into a card path defined by the housing of the payment interface. The at least one member can be oriented to inhibit an item from traveling through the card path. The activation rib can extend from the main body and can be located such that, when the main body is in the closed position, the activation rib extends into the card path. The activation rib can be coupled to the main body so force applied to the activation rib actuates the main body from the closed position to the open position.

In yet another aspect, a payment interface bezel can include a media sensor, a display, an interactive button for interfacing with a user, a bezel housing, and a gate assembly. The bezel housing can support the media sensor and can define a card path for guiding financial transaction cards to the media sensor. The bezel housing can define a document path for guiding a document to a document validator for verifying authenticity of the document. The gate assembly can include a housing, a main body, at least one member, and an activation rib. The housing can define at least a portion of the card path. The main body can be coupled to the housing and movable between a closed position and an open position. The at least one member can extend from the main body such that, when the main body is in the closed position, the at least one member extends into the card path and is oriented to inhibit an item from traveling through the card path. The activation rib can extend from the main body and can be located such that, when the main body is in the closed position, the activation rib extends into the card path. The activation rib can be coupled to the main body so force applied to the activation rib actuates the main body from the closed position to the open position.

One or more of the following features can be included in any feasible combination. For example, the activation rib can be located to discriminate between a card item and a non-card item. The non-card item can be a coin. The activation rib can be located substantially on an edge of the card path. The housing can further define a document path and the document path can intersect the card path at an intersection. One or more arm members can be included that are coupled to the main body and can separate the document path from the card path near the intersection when the main body is in the closed position. The one or more arm members can have a smooth side for allowing a document to traverse the document path when the main body is in the closed position. The activation rib can be integral with the main body and the activation rib can have a smooth ramp surface. A bezel housing can be included that guides a non-card item away from the activation rib. A bezel housing can be included having a locking feature configured to interface with the at least one member and the at least one member can be configured to completely traverse the card path when the main body is in the closed position.

The subject matter described herein can provide many advantages. For example, no software or electronics may be required to discriminate between card and non-card objects (such as optical sensors to discriminate between acceptable and non-acceptable cards). Additionally, the current subject matter can be installed in existing payment interface devices to enable retrofitting of the existing payment interface and reduce the need to completely replace the payment interface. Moreover, in some implementations, an object inserted in the card path does not need to be partially accepted before attempting to reject the object so unwanted objects can be prevented from entering a card path relatively closer to the entrance of the card path to reduce likelihood of jamming in the card path.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Described herein is a gate for a payment interface for distinguishing between financial transaction cards (e.g., credit cards) and non-card or non-acceptable objects, such as coins, keys, or other objects. The gate can prevent insertion of non-acceptable objects into a card path of a card reader.

Figure 1:
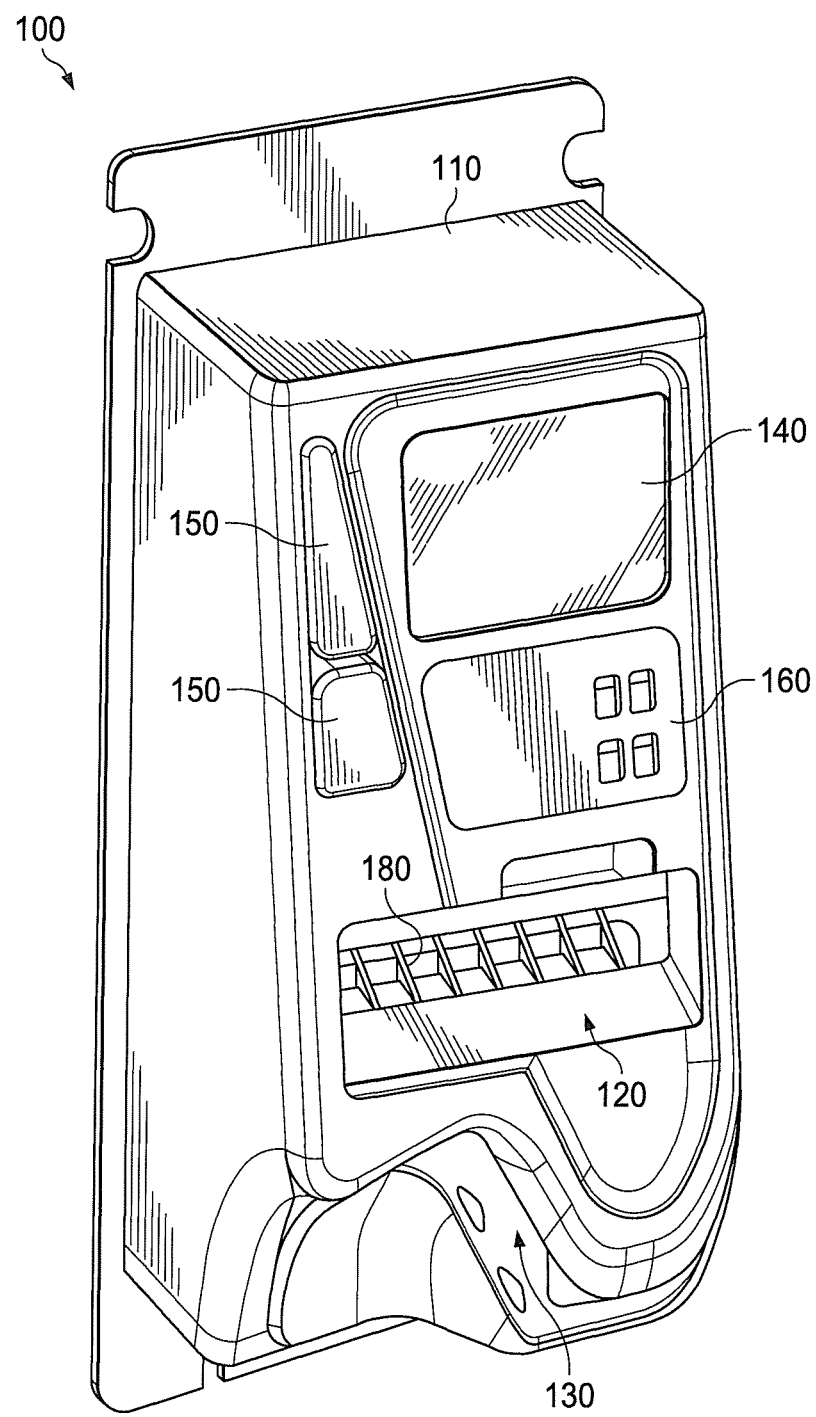
FIG. 1 is a front perspective view of an example implementation of a payment interface bezel.
Figure 2:
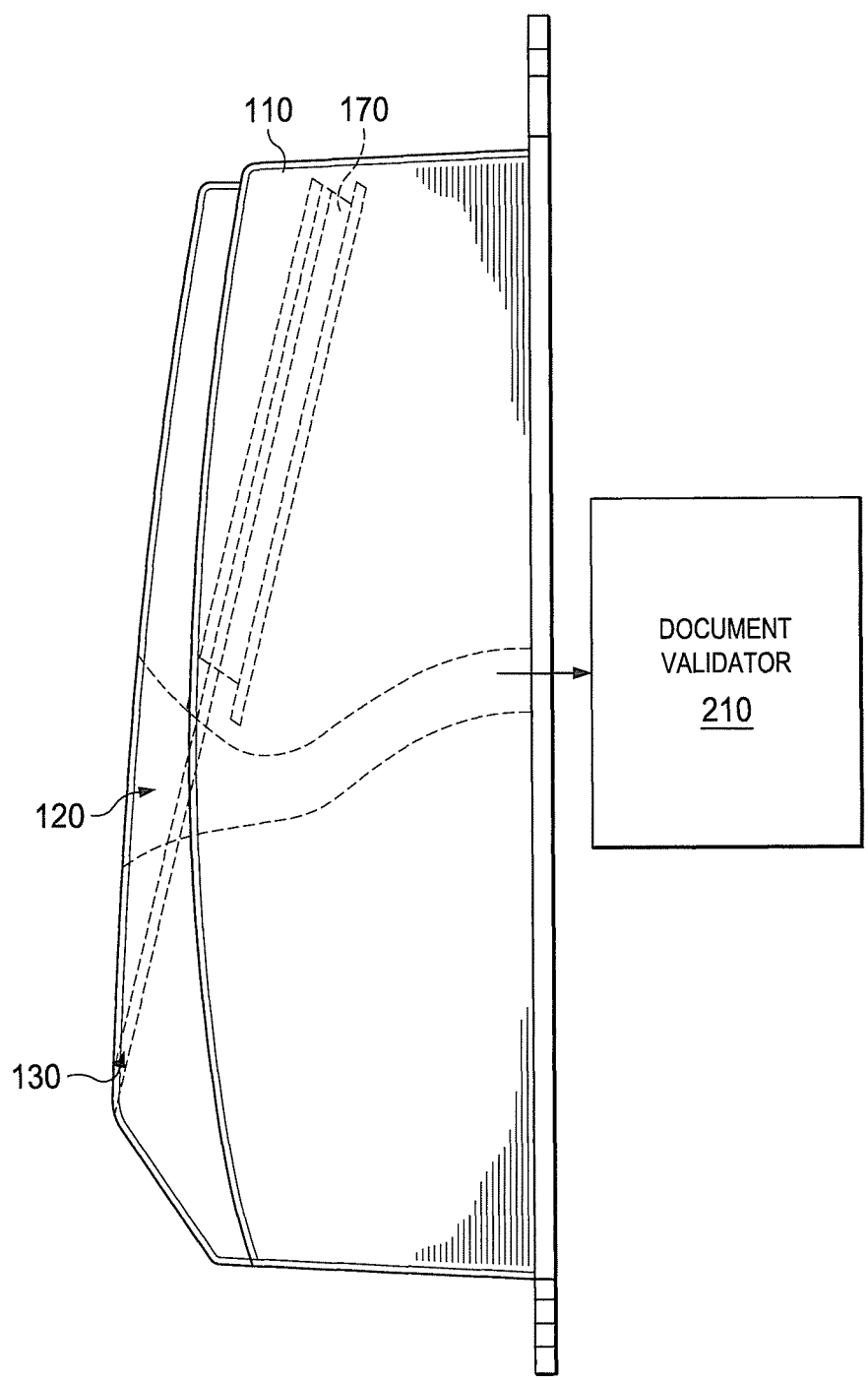
FIG. 2 is a side view of the example implementation of the payment interface bezel.

FIG. 1 illustrates an example implementation of a payment interface bezel 100 and FIG. 2 is a side view of the example implementation of the payment interface bezel 100. The payment interface bezel 100 can include a bezel housing 110, which can support one or more media sensors 170 such as a contact reader, a magnetic stripe reader, and the like. The payment interface bezel 100 can include a document path 120 for accepting documents such as paper currency and guiding the documents to a document validator 210 for determining the authenticity of the document. The payment interface bezel 100 can include a card path 130 for accepting financial transaction cards and guiding the financial transaction cards to media sensors for sensing data contained on the financial transaction cards. The payment interface bezel 100 can further include a display 140 and interactive buttons 150 for interfacing with a user, as well as a landing pad 160 for sensing contactless media on a card or other device.

In the example implementation illustrated in FIG. 1 and FIG. 2, the document path 120 and the card path 130 intersect (e.g., cross) substantially along their width. In some example implementations, the card path 130 and document path 120 can cross substantially perpendicular to one another. Such configurations can provide for a compact (in size) payment interface bezel 100. And in some other example implementations, the card path 130 and the document path 120 do not intersect.

A gate 180 can be included in the payment interface bezel 100. The gate 180 can be configured to allow objects or items shaped like financial transaction cards (e.g., credit cards) to pass through the card path 130 while inhibiting non-card or non-acceptable shaped objects (such as coins, keys, or other objects) from traveling the full length of the card path 130. In some example implementations, the gate 180 separates the card path 130 from the document path 120.

When no card is present, the gate 180 is closed, which allows documents to be freely accepted and paid out through the document path 120. When a user (e.g., a customer) presents a card, the gate 180 can move (e.g., slide, translate, rotate, and/or the like) open, allowing the customer to swipe the card.

Figure 4:
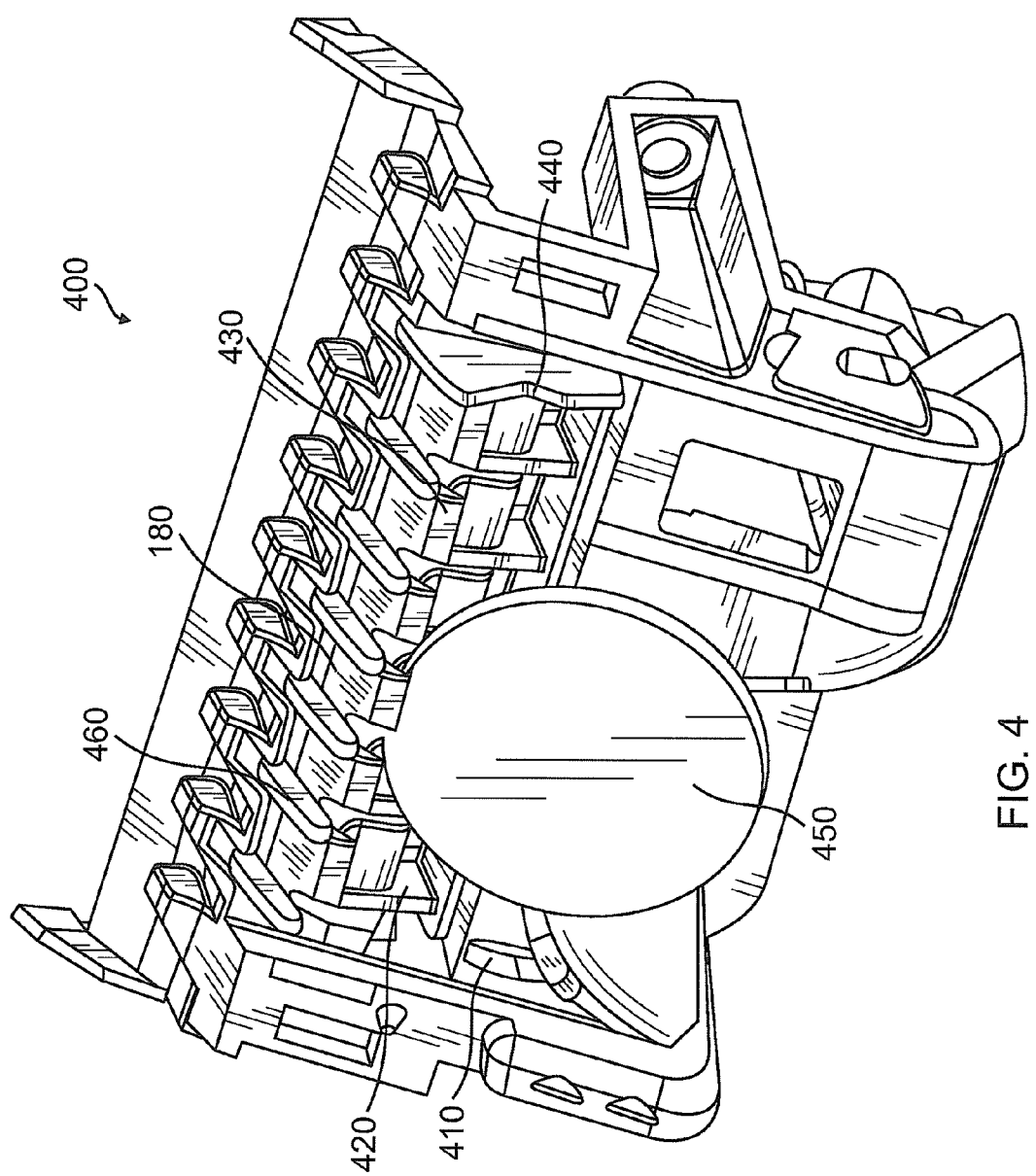
FIG. 4 is a cutaway view of the example implementation of the payment interface bezel with a gate that can discriminate between a card and a non-card or non-acceptable object, such as a coin.
Figure 5:
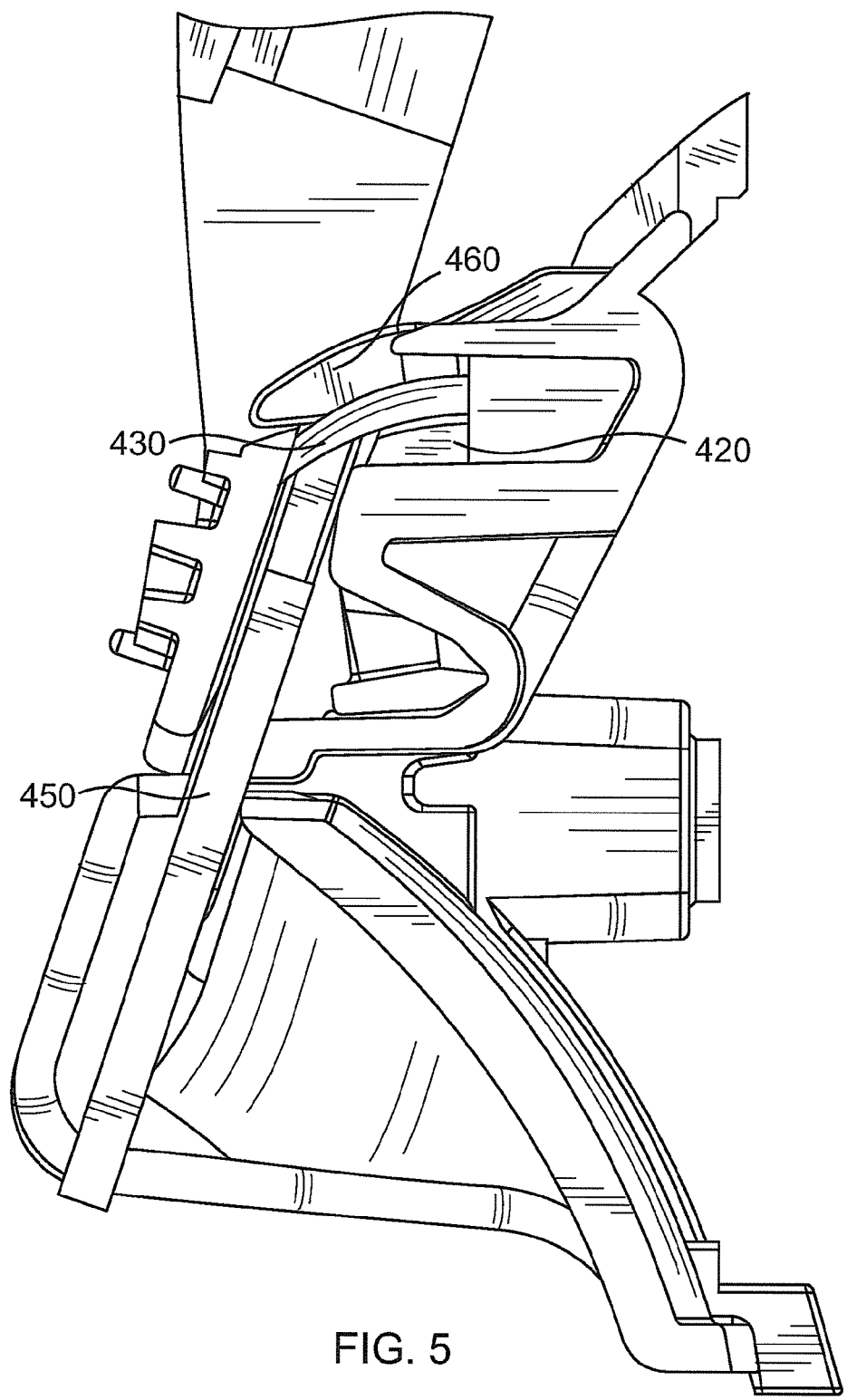
FIG. 5 is a cross section view of the example implementation of the payment interface bezel with gate illustrated in FIG. 4.

FIG. 4 is a cutaway view of the example implementation of the payment interface bezel 100 with a gate 180 that can discriminate between a card and a non-card or non-acceptable object, such as a coin. FIG. 5 is a cross section view of the example implementation of the payment interface bezel 100 with gate 180 illustrated in FIG. 4. The gate 180 can be mounted or coupled to a housing 410. The gate 180 and the housing 410 can form a gate assembly 400. The housing 410 can define a portion of the card path 130 (e.g., a portion of a side of the card path 130 can comprise the housing 410) such that a card or other object traveling through the card path 130 passes the gate 180. In FIG. 4, the gate 180 is illustrated in a closed position.

The gate 180 can include a main body 420 mounted or coupled to the housing 410 and movable between the closed position and the open position. In the example implementation illustrated in FIG. 4, the main body 420 can move between the closed position and the open position by rotating; however, other mounts are possible, such as sliding, translating, and the like. Hook members 430 can extend from the main body 420 and, when the gate 180 is in the closed position, the hook members 430 can extend into the card path 130. The hook members 430 can be oriented and/or shaped to catch or inhibit objects, such as coin 450, traveling through the card path 130 when the gate 180 is in the closed position. The hook members 430 can be curved or straight (e.g., members or blocking members). In the example implementation, each of the one or more hook members 430 is a projection curving towards the entrance of the card path 130.

The gate 180 can include an activation rib 440 extending from the main body 420. When the gate 180 is in the closed position, the activation rib 440 can extend into the card path 130. The activation rib 440 can be coupled to the main body 420 so force applied to the activation rib actuates the gate 180 from the closed position to an open position, which can withdraw the hook members 430 from the card path 130. The force can be applied by an object moving through the card path 130 (e.g., the object can push on the activation rib 440 to actuate the gate 180 between closed and open positions). When the hook members 430 are withdrawn from the card path 130, objects can pass uninhibited by the gate 180 down the card path 130 past the gate 180.

The activation rib 440 can be located substantially on an edge or side of the card path 130. Such location can allow the gate 180 to discriminate between card-shaped objects and non-acceptable or non-card objects based on a width of the object or item being inserted into the card path 130. For example, as illustrated in the example implementation of FIG. 4, the activation rib 440 is located substantially on the edge of the card path 130. Because the coin 450 is of a sufficient size and is round, the coin 450 cannot (or has a small chance to) contact the activation rib 440.

Gate 180 can include arm members 460 that can extend from the main body 420 and/or the hook members 430. When the gate 180 is in the closed position, the arm members 460 can separate the document path 120 from the card path 130 near the intersection of the two paths. The arm members 460 can have a smooth side for allowing a document to traverse the document path 120 when the main body 420 is in the closed position and prevent a document from catching on a slot or opening created by the intersection with the card path 130. When the gate 180 is in the open position, the arm members 460 can rotate to block the document path 120. Thus the gate 180 can ensure that a document and a card cannot be inserted simultaneously. (E.g., when one of the two paths is in use, the other path can become inoperable). In some implementations, the arm members 460 do not block the document path 120 when the gate 180 is in the open position. A document in the document path 120 can prevent a card from being fully inserted into the card path 130, and a card in the card path 130 can prevent a document from being fully inserted into the document path 120.

Figure 6:
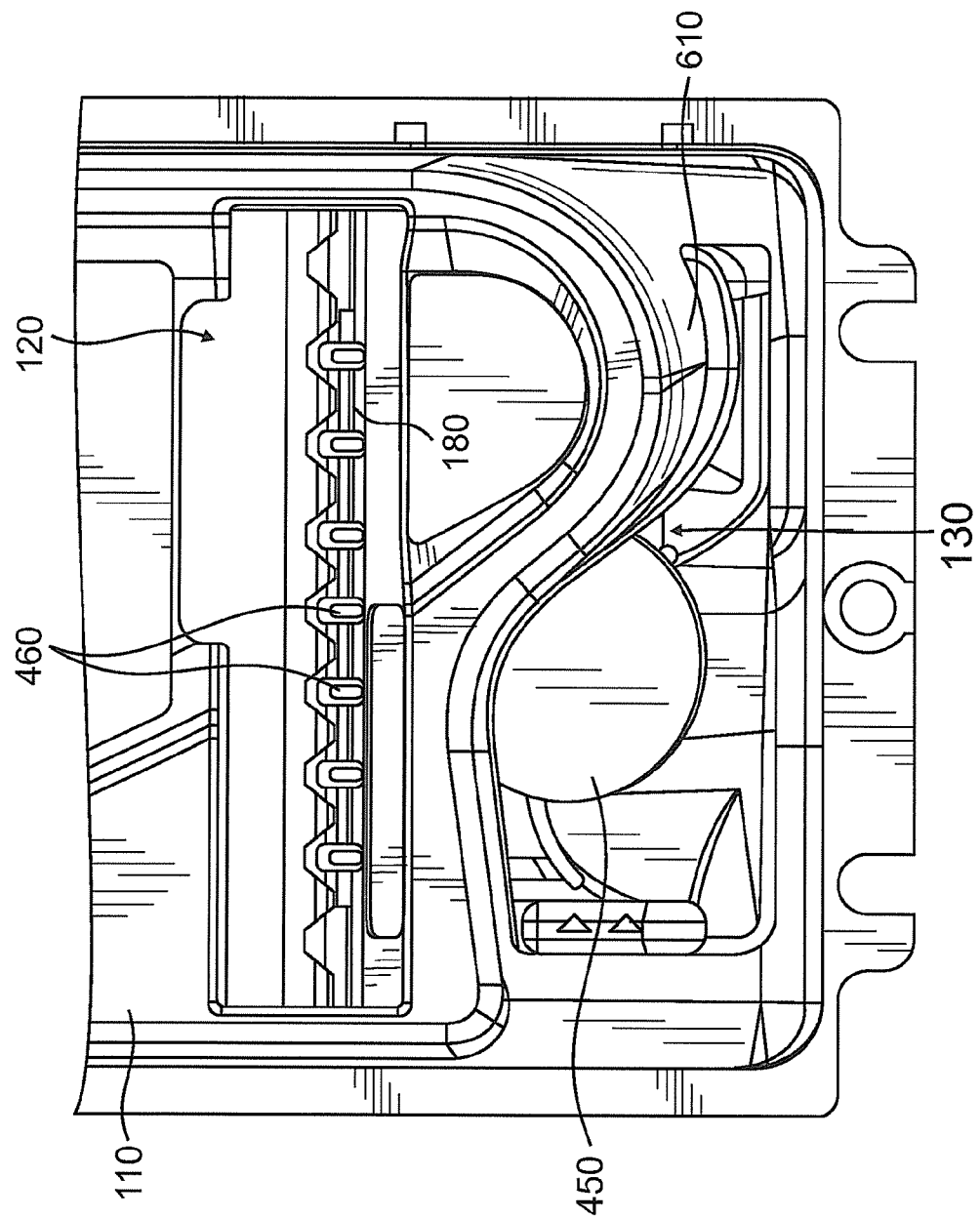
FIG. 6 is a front view of a portion of the example payment interface bezel illustrated in FIGS. 4-5, in which a coin has been inserted into the card path.

FIG. 6 is a front view of a portion of the example payment interface bezel 100 illustrated in FIGS. 4-5, in which a coin has been inserted into the card path 130. The bezel housing 110 can include geometry (as indicated at 610) or a second housing for guiding a coin 450 or other non-acceptable item away from the activation rib 440. The bezel housing 110 geometry can be shaped so that a user does not have clearance to insert a coin sufficiently far enough down the card path 130 along one side of the card path 130 to actuate the activation rib 440 and thereby open the gate 180 (at least without additional coins and/or objects being inserted into the card path 130).

Figure 7:
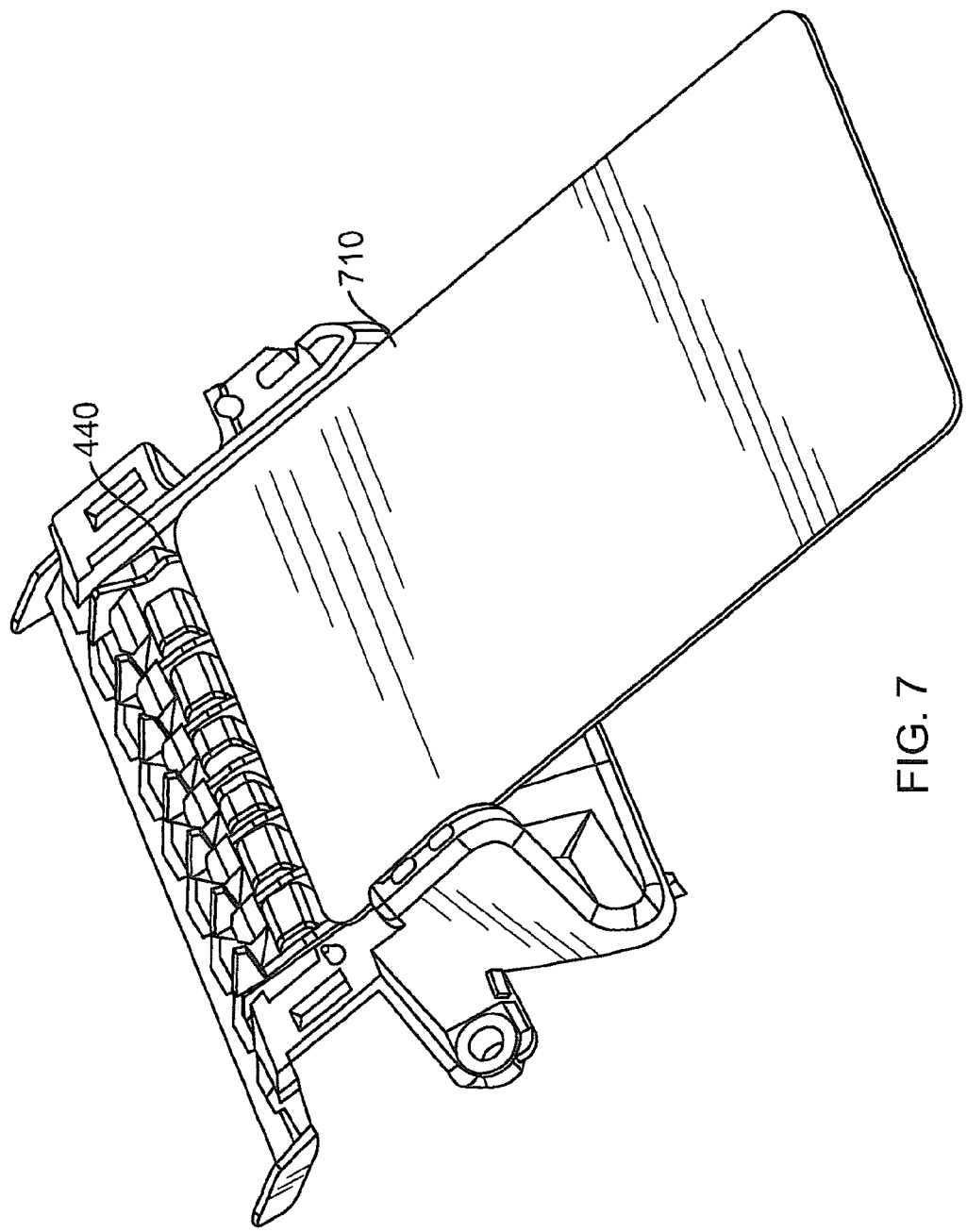
FIG. 7 is a cutaway view of the example implementation of the payment interface bezel illustrating the gate being actuated by a credit card.

FIG. 7 is a cutaway view of the example implementation of the payment interface bezel 100 illustrating the gate 180 being actuated by a credit card 710. The credit card 710 has been inserted into the card path 130 and is applying a force on the activation rib 440. Because the credit card 710 is substantially the width of the card path 130, the credit card 710 contacts the activation rib 440 before contacting and being inhibited by the hook members 430.

Figure 3:
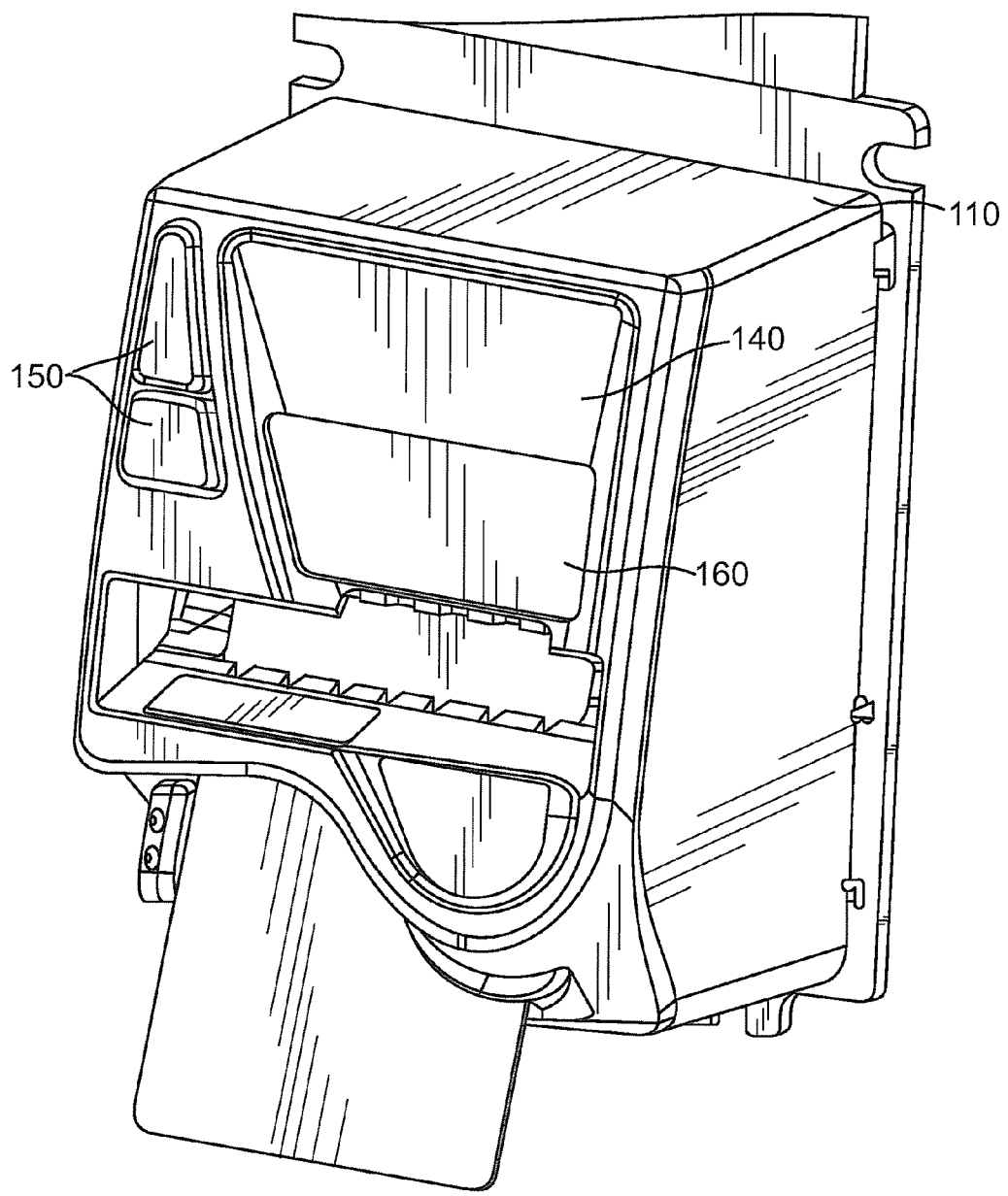
FIG. 3 is a front perspective of the example implementation of the payment interface bezel illustrating a credit card having actuated a gate into an open position.
Figure 8:
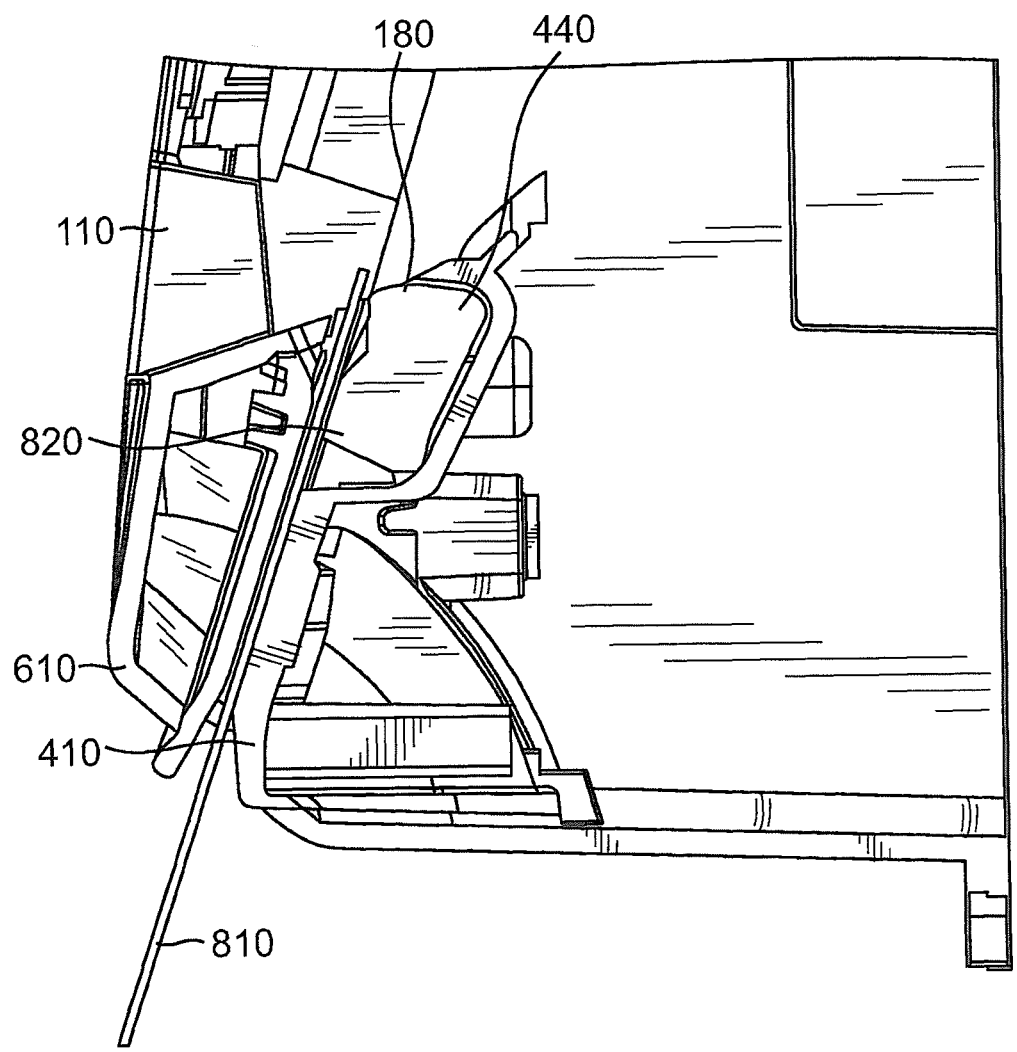
FIG. 8 is a cross-section view of a portion of the example implementation of the payment interface bezel illustrating a credit card having actuated gate into the open position.

FIG. 8 is a cross-section view of a portion of the example implementation of the payment interface bezel 100 illustrating a credit card 810 having actuated the gate 180 into the open position and a leading edge of the credit card 810 having traveled just past the gate 180. FIG. 3 is a front perspective view thereof. As seen in FIG. 8, the activation rib 440 can include a smooth ramp surface 820 for contacting the leading edge of the credit card 810 and allowing the gate 180 to move (e.g., rotate, translate, slide, and the like) from the close position to the open position.

The gate 180 can include a spring bias to transition the gate 180 from the open position to the closed position when a card is removed from the card path 130. Other biasing mechanisms are possible.

Figure 9:
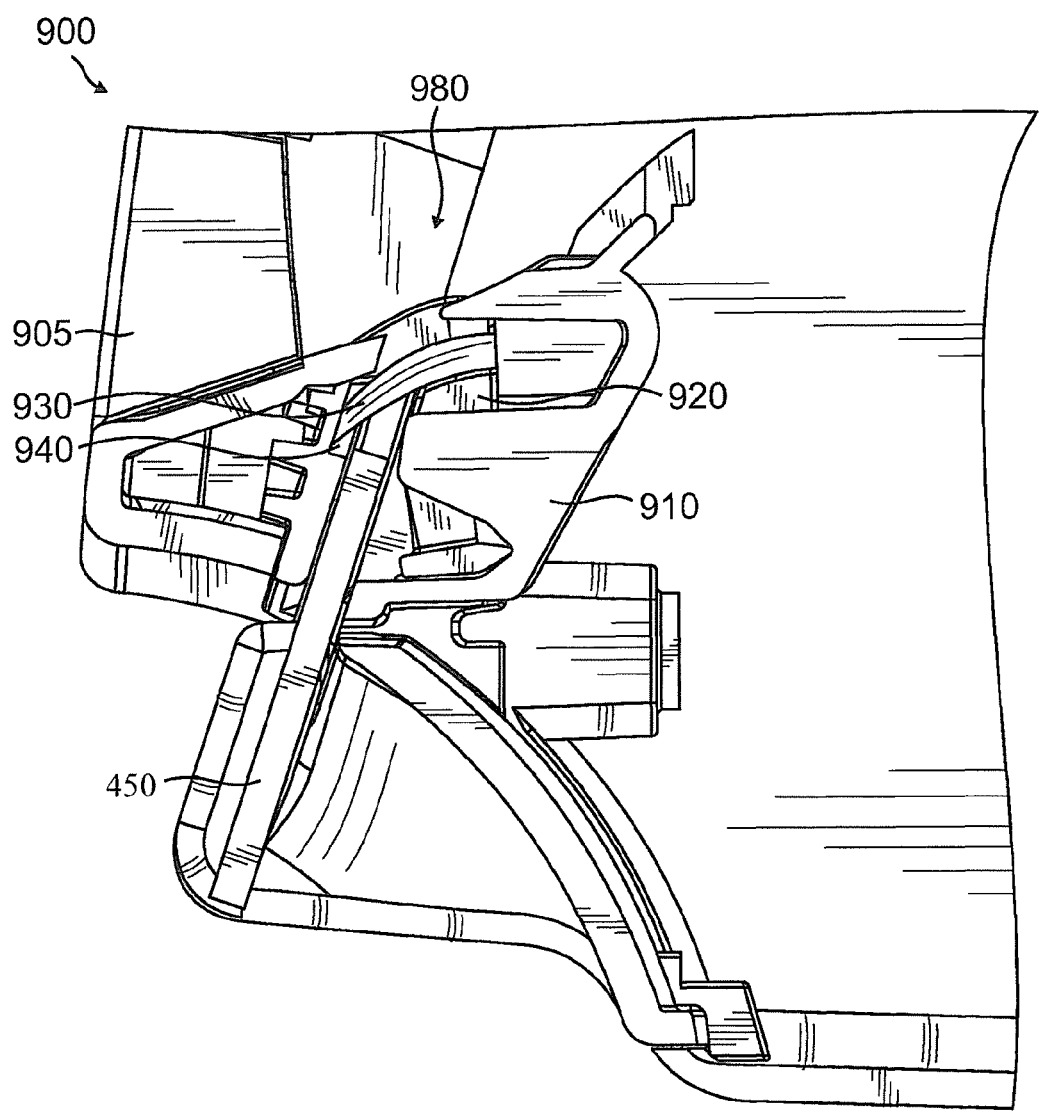
FIG. 9 is a cross-section view of another example implementation of a payment interface bezel.

FIG. 9 is a cross-section view of another example implementation of a payment interface bezel 900. In this example implementation, hook members 930 extend from gate 180 main body 920 and completely traverse the card path 130. A locking feature 940 can be included on the card path 130 opposite the gate 980. The locking feature 940 can provide additional support to the gate 180 for resisting insertion of a non-acceptable. The payment interface bezel 900 can include a bezel housing 905 coupled to a gate housing 910. The gate 980 can be movably mounted or coupled to the gate housing 910.

The financial transaction card media type can be any media type suitable for inputting, storing, outputting, and updating data on a standardized financial transaction card. The media type can include magnetic stripes, integrated chips, integrated chips and pins, radio frequency (RF) devices, near field communication (NFC) devices, and the like. Media sensors 170 can include any suitable media sensor appropriate for sensing media types found in standardized financial transaction card. For example, suitable media sensors can include magnetic stripe readers, chip readers, chip and pin readers, contactless readers, prepaid card readers, RF readers, NFC readers, and the like.

In some implementations, multiple activation ribs can be included with the gate. For example, a gate can include multiple parts, with a first activation rib substantially near one edge of a card path, and a second activation rib substantially near another (e.g., opposite) edge of the card path. Levers can be included with the activation ribs to lock the gate in the closed position until both of the activation ribs are actuated, releasing the levers, and allowing the gate to open.

Although a few variations have been described in detail above, other modifications are possible. For example, the implementations described above can be directed to various combinations and subcombinations of the disclosed features and/or combinations and subcombinations of several further features disclosed above. In addition, the logic flows described herein do not require the particular order shown, or sequential order, to achieve desirable results. Other embodiments may be within the scope of the following claims.

What is claimed is:

1. A gate assembly comprising:
    a card path of a payment interface formed at least partially by a housing and configured to receive a card item;
    a main body configured to move from a closed position obstructing the card path with one or more members to an open position opening the card path by removing the one or more members from the card path;
    an activation rib extending from the main body and positioned within the card path, the activation rib configured to move the main body from the closed position to the open position in response to receiving a force via the card item; and
    a bezel housing configured to guide a non-card item in a direction within the card path away from the activation rib.

2. The gate assembly of claim 1, wherein the card path is configured to prevent the activation rib from receiving a force to move the main body when a non-card item is received by the card path.

3. The gate assembly of claim 2, wherein the non-card item is a coin.

4. The gate assembly of claim 2, wherein the activation rib is positioned on an edge of the card path.

5. The gate assembly of claim 1, further comprising a document path formed at least partially by the housing, wherein the document path intersects with the card path at an intersection.

6. The gate assembly of claim 5, further comprising one or more arm members configured to separate the document path from the card path near the intersection when the main body is in the closed position, wherein the one or more arm members comprise a smooth surface configured to allow a document to be received by the document path when the main body is in the closed position.

7. The gate assembly of claim 1, wherein the activation rib comprises a smooth ramp surface.

8. The gate assembly of claim 1, wherein the bezel housing has a locking feature configured to engage with the one or more members, wherein the one or more members is configured to traverse an entire cross section of the card path when the main body is in the closed position.

9. A gate comprising
    a main body configured to attach to a housing of a payment interface device and configured to move between a closed position and an open position;

at least one member extending from the main body and configured to obstruct a card path formed by the housing when the main body is in the closed position;

an activation rib extending from the main body into the card path and configured to move the main body from the closed position to the open position when a card item is received by the card path and a force is received by the activation rib via the card item while the main body is in the closed position; and a bezel housing configured to guide a non-card item in a direction within the card path away from the activation rib.

10. The gate of claim 9, wherein the card path is configured to prevent the activation rib from receiving a force to move the main body when a non-card item is received by the card path.

11. The gate of claim 10, wherein the non-card item is a coin.

12. The gate of claim 10, wherein the activation rib extends from the main body into the card path at an edge of the card path.

13. The gate of claim 9, wherein the housing further forms a document path that intersects with the card path at an intersection.

14. The gate of claim 13, further comprising one or more arm members configured to separate the document path from the card path near the intersection when the main body is in the closed position, wherein the one or more arm members comprise a smooth surface configured to allow a document to be received by the document path when the main body is in the closed position.

15. The gate of claim 9, wherein the activation rib comprises a smooth ramp surface.

16. The gate of claim 9, wherein the bezel housing has a locking feature configured to engage with the at least one member, wherein the at least one member is configured to traverse an entire cross section of the card path when the main body is in the closed position.

17. A payment interface bezel comprising:
a media sensor;
a display;
an input unit configure to receive a user input;
a bezel housing forming a card path and a document path, wherein the card path is configured to receive a financial transaction card and communicate the financial transaction card to the media sensor, and wherein the document path is configured to communicate a document to a document validator to authenticate the document; and a gate assembly comprising:
a housing at least partially forming the card path;
a main body configured to transition from a closed position obstructing the card path using one or more members to an open position opening the card path by removing the one or more members from the card path; and
an activation rib coupled to and extending into the card path, wherein force, via the financial transaction card, applied to the activation rib causes the activation rib to move the main body from the closed position to the open position,
wherein the housing guides a non-card item in a direction within the card path away from the activation rib.

18. The payment interface bezel of claim 17, wherein the card path is configured to prevent the activation rib from receiving a force to move the main body when another item different from the financial transaction card is received by the card path.

19. The payment interface bezel of claim 18, wherein the activation rib extends from the main body into the card path at an edge of the card path.

20. The payment interface bezel of claim 17, further comprising one or more arm members configured to separate the document path from the card path near an intersection of the card path and the document path when the main body is in the closed position, wherein the one or more arm members comprise a smooth surface to allow the document to be received by the document path when the main body is in the closed position.

* * * * *